(12) United States Patent
Williamson et al.

(10) Patent No.: US 12,248,458 B1
(45) Date of Patent: *Mar. 11, 2025

(54) OFFLINE STRUCTURED DATA NAVIGATION ON A MOBILE DEVICE

(71) Applicant: QuickBase, Inc., Cambridge, MA (US)

(72) Inventors: Jonathan Williamson, Cambridge, MA (US); Siddhant Benadikar, Cambridge, MA (US)

(73) Assignee: QUICKBASE INC., Cambridge, MA (US)

( * ) Notice: Subject to any disclaimer, the term of this patent is extended or adjusted under 35 U.S.C. 154(b) by 430 days.

This patent is subject to a terminal disclaimer.

(21) Appl. No.: 16/952,562

(22) Filed: Nov. 19, 2020

(51) Int. Cl.
*G06F 16/23* (2019.01)
*G06F 9/451* (2018.01)
*G06F 16/25* (2019.01)
*G06F 40/174* (2020.01)
*H04L 67/01* (2022.01)

(52) U.S. Cl.
CPC .......... *G06F 16/2379* (2019.01); *G06F 9/451* (2018.02); *G06F 16/2372* (2019.01); *G06F 16/252* (2019.01); *G06F 40/174* (2020.01); *H04L 67/01* (2022.05)

(58) Field of Classification Search
CPC .. G06F 16/2379; G06F 9/451; G06F 16/2372; G06F 16/252; G06F 40/174; H04L 67/01
See application file for complete search history.

(56) References Cited

U.S. PATENT DOCUMENTS

| | | |
|---|---|---|
| 5,705,443 A | 1/1998 | Stauf et al. |
| 6,076,092 A | 6/2000 | Goldberg et al. |
| 6,389,429 B1 | 5/2002 | Kane et al. |
| 6,473,765 B1 | 10/2002 | Fink |
| 6,725,235 B1 | 4/2004 | Dyer et al. |
| 7,257,597 B1 | 8/2007 | Pryce et al. |
| 7,389,330 B2 | 6/2008 | Dillon |
| 7,490,073 B1 | 2/2009 | Qureshi et al. |
| 7,647,298 B2 | 1/2010 | Adya et al. |
| 7,657,516 B2 | 2/2010 | Zaman et al. |
| 7,974,878 B1 * | 7/2011 | Chu .................... G06Q 30/0273 705/14.69 |

(Continued)

OTHER PUBLICATIONS

React-native-offline-cache-webview, v 0.1.2, ReadMe webpage, published Jun. 14, 2018, downloaded from https://www.npmjs.com/package/react-native-offline-cache-webview on Feb. 27, 2021.

*Primary Examiner* — Rami R Okasha
(74) *Attorney, Agent, or Firm* — Davis Malm D'Agostine, PC.; David J. Powsner

(57) ABSTRACT

The invention provides, in some aspects, a digital data processing method that includes executing a remote app on a client digital data processor that is adapted to be at least intermittently connected for communications with a server digital data processor and, with the remote app, requesting from the server digital data processor a schema of a table used by the app. The remote app uses that to facilitate user navigation of records or other structured data in the table by presenting a view or report of such records (or other structured data) in the table in accord with a format and content defined in the schema and/or selecting table data for presentation in the view or report based on a query defined in that schema.

12 Claims, 1 Drawing Sheet

(56) References Cited

U.S. PATENT DOCUMENTS

| | | |
|---|---|---|
| 8,335,772 B1 | 12/2012 | Ramesh et al. |
| 8,407,255 B1 | 3/2013 | Srivastava et al. |
| 8,600,994 B1 | 12/2013 | Xu et al. |
| 9,311,357 B2 * | 4/2016 | Ramesh ............... G06F 16/2393 |
| 9,317,557 B2 | 4/2016 | Shao et al. |
| 9,633,060 B2 * | 4/2017 | Caudy .................... H04L 67/01 |
| 10,061,852 B1 * | 8/2018 | Plenderleith .......... H04L 67/568 |
| 10,307,501 B2 | 6/2019 | Dayton |
| 10,547,679 B1 * | 1/2020 | Burnett ............... H04L 67/1095 |
| 10,909,091 B1 * | 2/2021 | Shah ..................... G06F 16/211 |
| 11,089,133 B1 * | 8/2021 | Patel .................... H04L 67/562 |
| 11,474,996 B1 * | 10/2022 | Meyers ............... G06F 16/2379 |
| 2003/0101035 A1 | 5/2003 | Gabele et al. |
| 2004/0181538 A1 | 9/2004 | Lo et al. |
| 2004/0258053 A1 | 12/2004 | Toporek |
| 2005/0154742 A1 | 7/2005 | Roth |
| 2005/0160104 A1 | 7/2005 | Meera et al. |
| 2006/0095447 A1 * | 5/2006 | Dickinson ............... G06F 40/18 |
| 2006/0106832 A1 | 5/2006 | Ben-Dyke et al. |
| 2006/0117073 A1 * | 6/2006 | Bosworth ............. G06F 16/273 |
| 2007/0050323 A1 | 3/2007 | Dettinger et al. |
| 2007/0162274 A1 | 7/2007 | Ruiz et al. |
| 2007/0226203 A1 | 9/2007 | Adya et al. |
| 2008/0208789 A1 | 8/2008 | Almog |
| 2010/0169380 A1 | 7/2010 | Miller et al. |
| 2011/0078233 A1 * | 3/2011 | Salazar .................. H04L 67/14 709/206 |
| 2011/0145363 A1 | 6/2011 | Ananthanarayanan |
| 2011/0307501 A1 | 12/2011 | Terwilliger et al. |
| 2012/0246179 A1 | 9/2012 | Garza et al. |
| 2013/0046719 A1 | 2/2013 | Sogo |
| 2013/0147820 A1 | 6/2013 | Kalai |
| 2013/0147846 A1 | 6/2013 | Kalai |
| 2013/0332487 A1 * | 12/2013 | Ramesh ............. G06F 16/2455 707/775 |
| 2013/0339407 A1 | 12/2013 | Sharpe |
| 2015/0055594 A1 | 2/2015 | Nirantar |
| 2015/0149496 A1 * | 5/2015 | Neeman ........... G06F 16/90335 707/760 |
| 2016/0196321 A1 * | 7/2016 | Kraljevic ................ G06F 16/27 707/621 |
| 2017/0017669 A1 | 1/2017 | Eberlein |
| 2017/0195450 A1 | 7/2017 | Su |
| 2018/0189397 A1 | 7/2018 | Norman |
| 2018/0246704 A1 * | 8/2018 | Rabins ..................... G06F 8/65 |

* cited by examiner

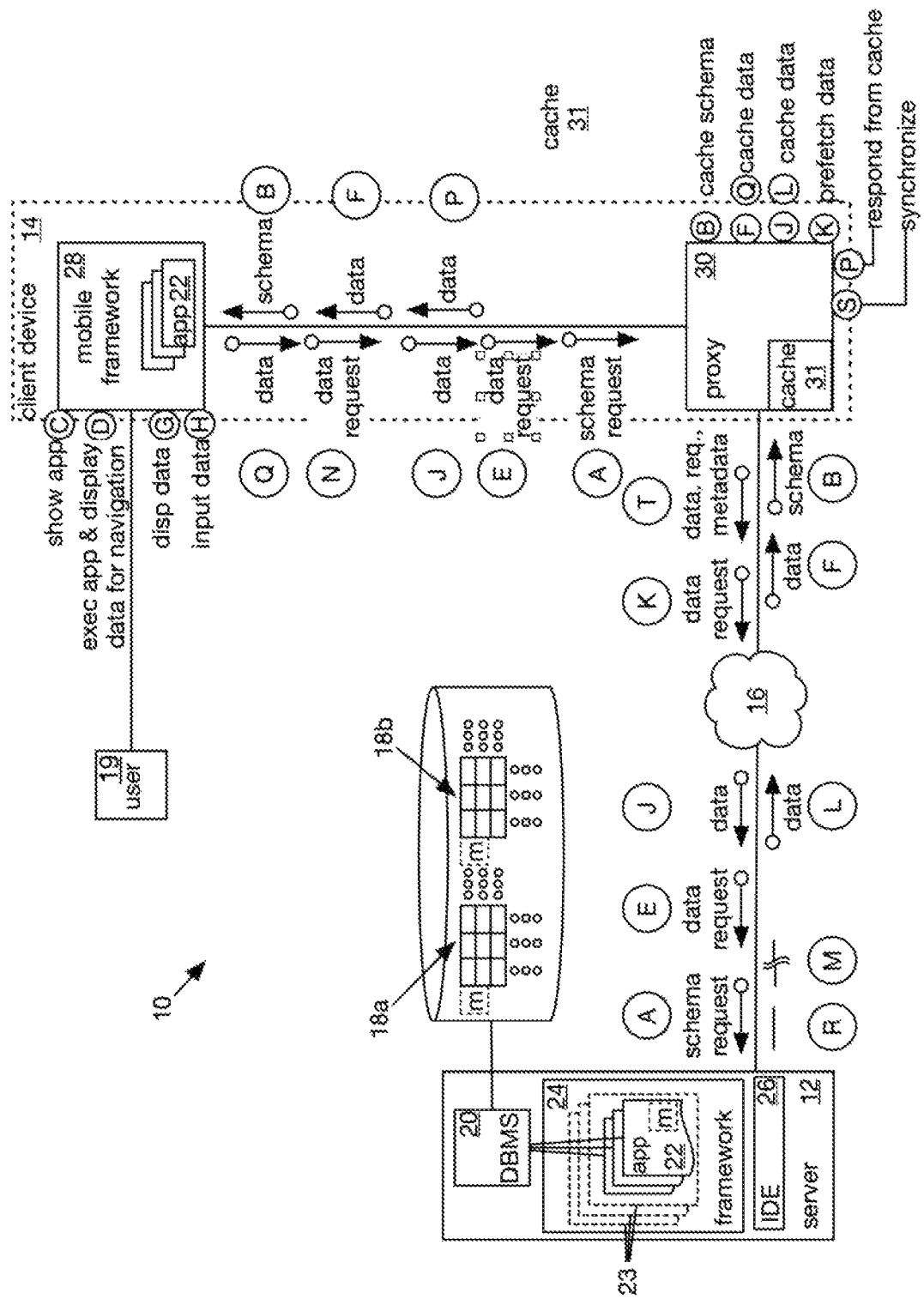

OFFLINE STRUCTURED DATA NAVIGATION ON A MOBILE DEVICE

BACKGROUND OF THE INVENTION

The invention pertains to mobile data processing and, more particularly, to systems and methods supporting structured data entry, navigation and access by mobile software applications that lack access to a server on which the data is stored.

Computer software applications that maintain data for common access, e.g., within an enterprise, are typically closely bound to the central computers, or "servers," that store the data. This presented little problem before the advent of the personal computer. Most client devices of the day were of the "thin" variety, effectively, making each of their operators a user of the central server, itself—albeit possibly from remote locations over networks or dial-up lines. This simplified issues of data availability, contention, navigation (e.g., finding and viewing existing data in tables or adding new data), and the like, since a server's operating and file systems could closely monitor time-shared processes that gained access to and/or updated the shared data.

Personal computers and, more recently, app-capable mobile devices have made data sharing and navigation more complicated. While early adopters were often willing to accept read-only access to (potentially stale) shared data in exchange for mobility and independence, modern-day users are not. Advances in both hardware and software have made it possible for users at networked (or "connected") sites around the globe to access enterprise data as fully as if they were all camped around the central server itself.

The rub, of course, is for users of devices that are only intermittently connected to the server. They have come to accept occasional data loss or, more often, unavailability—or, even when available, an inability to properly find or view existing data, much less, to enter new data. For those who regularly travel, for example, these inconveniences come with the territory. And, though some of the latest web app-based programming techniques seek to minimize the inconvenience, their adoption is largely limited to new software applications—not legacy ones nor those written in the "old" style that assumed connectedness.

An object of the invention is to provide improved methods and apparatus for mobile and/or remote data processing.

A further object of the invention is to provide such methods and apparatus as facilitate access to server-stored data by users of mobile and/or remote devices.

A related object is to provide such methods and apparatus as facilitate structured data entry, navigation and/or data access on mobile and/or remote devices.

Further related objects of the invention are to provide such methods and apparatus as facilitate data entry, navigation and or data access on mobile and/or remote devices with only intermittent or occasional network access.

SUMMARY OF THE INVENTION

The foregoing objects are among those attained by the invention which provides, in some aspects, a digital data processing system, that includes a server digital data processor that maintains (i) one or more tables, each comprising records or other structured data (collectively, "records"), (ii) a schema for each of the remote app and of one or more of the tables dedicated to or associated with the app, where each schema comprises a collection of metadata for the respective app or table. A client digital data processor is at least intermittently connected for communications with the server, and a remote app executes on that client digital data processor. The app includes instructions to cause that digital data processor request a record from one of the tables, to update data in that record and to request storage of the update back to the tables. The remote app utilizes the schemas to prefetch data from the one or more tables dedicated to or associated with the app.

In other aspects, the invention provides a digital data processing system, e.g., as described above, that utilizes a proxy executing on the client digital data processor to accommodate interruptions in connectivity between the client digital data processor and the server digital data processor by alternatively (i) passing to the server, during intervals when there is connectivity, requests made by or on behalf of the remote app and routing back to the remote app responses by the server to those requests, and (ii) when connectivity is lacking, responding to those requests directly and without, first, passing them to the server.

Related aspects of the invention provide a digital data processing system, e.g., as described above, wherein the server digital data processor maintains a schema for each of the remote app and of one or more of the tables dedicated to or associated with the app, where each schema comprises a collection of metadata for the respective app or table. The proxy utilizes the schemas to prefetch data from the one or more tables dedicated to or associated with the app.

In still further related aspects of the invention, the proxy, e.g., of a system as described above, uses the prefetched data to respond to requests made by or on behalf of the app when connectivity is lacking.

Yet still other aspects of the invention provide a digital data processing system, e.g., as described above, wherein the proxy caches data prefetched from the one or more tables and uses the cached data to respond to requests made by or on behalf of the app when connectivity is lacking.

Still yet other aspects of the invention provide a digital data processing system, e.g., as described above, wherein the remote app executes instructions to request storing data to one or more of the tables, and wherein the proxy alternatively (i) passes to the server, during intervals when there is connectivity, requests made by or on behalf of the remote app to store data to one or more tables, and (ii) when connectivity is lacking, caches the data contained in those without, first, passing them to the server.

In other related aspects, the invention provides a digital data processing system, e.g., as described above, wherein the proxy synchronizes cached data with the sever digital data processor when connectivity is re-established following an interval when connectivity was lacking.

Still other aspects of the invention provide a digital data processing system, e.g., as described above, wherein the schema maintained by the server digital data processor for the remote app comprises one or more of the remote app name and/or identification, the remote app description, names and/or identifications of tables used in remote app, and names and/or identifications of variables used in the remote app, and/or wherein the schema maintained by the server digital data processor for each table comprises one or more of the table name and/or identification, the table description, a count of records in the table, names and types of data fields in the table, definitions of queries, views and reports for use in navigating the table.

In other aspects, the invention provides a method that includes executing a remote app on a client digital data processor that is adapted to be at least intermittently connected for communications with a server digital data processor and, with the remote app, requesting from the server digital data processor a schema of a table used by the app. The remote app uses that to facilitate user navigation of records or other structured data in the table by presenting a view or report of such records (or other structured data) in the table in accord with a format and content defined in the schema and/or selecting table data for presentation in the view or report based on a query defined in that schema.

Related aspects of the invention provide a method, e.g., as described above, that includes presenting to the user a form for data entry into the table, where a format and content of the form is defined by the schema.

In other related aspects, the invention provides such a method that includes displaying to the user upon execution of the remote app a default view of the table, where the format and content of that view is defined in the schema. The records or other structured data in that view can be winnowed, according to related aspects of the invention, in accord with a default query also defined in the schema.

Further aspects of the invention provide a method, e.g., as described above, that includes presenting to the user options based on the definitions provided in that schema for any of querying the table and/or presenting views, reports or data input forms for it. The schema, which according to other aspects of the invention, is not hard-coded into the remote app, can comprise any of a markup language, a scripting language or other coding defining any of the format and content of a view, the format and content of a report, and a query.

Further aspects of the invention provide a method, e.g., as described above, wherein the remote app utilizes the schema for at least presenting a view of table data, generating a report of table data and selecting records for presentation in a view or report—all, notwitstanding a loss of connectivity between the client digital data processor and the server digital data processor.

In related aspects of the invention, there is provided a method, e.g., as described above, wherein the remote app utilizes the schema to present table data during a period of lost connectivity based on (i) table data received from the server digital data processor prior to such loss of connectivity, and (ii) updates to that data by the remote app.

Still further related aspects of the invention provide a method, e.g., as described above, in which a proxy executing on the client digital data processor accommodates interruptions in connectivity between the client digital data processor and the server digital data processor by alternatively (i) passing to the server digital data processor, during intervals when there is connectivity, requests made by or on behalf of the remote app and routing back to the remote app responses by the server digital data processor to those requests, and (ii) responding to those requests directly and without, first, passing them to the server digital data processor when connectivity is lacking.

In further related aspects of the invention, a method, e.g., as described above, can include utilizing the schema to prefetch data from the table. That prefetched data can, according to still further aspects of the invention, be used to respond to requests made by or on behalf of the app when connectivity is lacking-including for purposes of generating views and/or reports of the table data.

Further aspects of the invention provide a methods of digital data processing paralleling operation of the digital data processing system described above.

Yet still further aspects of the invention provide a client digital data processor operating in the manner described above.

These and other aspects of the invention are evident in the discussion that follows and in the drawings.

BRIEF DESCRIPTION

A more complete understanding of the invention may be attained by reference to the drawings, in which FIG. 1 depicts a digital data processing system according to the invention including a client device configured for access to, entry of and navigation of structured, shared data maintained on a remote server.

DETAILED DESCRIPTION OF THE ILLUSTRATED EMBODIMENT

Architecture

FIG. 1 depicts a digital data processing system 10 according to the invention including a client device adapted for offline access to, entry of and navigation of structured, shared data maintained on a remote server. The system 10 includes a server 12 coupled to a client device 14 via network 16. Server 12, client device 14 and network 16 are of the conventional variety of such devices known in the art as adapted in accord with the teachings hereof.

The Server

Server 12, which may be a mainframe, workstation, desktop or other computing device of the type known in the art (as adapted in accord with the teachings hereof), maintains—i.e., retrieves data from, stores data to, and otherwise manages—data tables, data sets and/or other structured data (collectively, "tables") 18a, 18b (collectively, "table 18" or "tables 18") all per convention in the art as adapted in accord with the teachings hereof. This can be in response to requests from apps 22 executing on the server 12 and/or client devices 14, again, as per convention in the art as adapted in accord with the teachings hereof. To these ends, the server 12 stores tables 18 locally or remotely and accesses them using a relational or other database management system 20 that provides for execution of at least fundamental database management operations with respect thereto—including, for example, table creation, retrieval, updating and deletion (i.e., the so-called CRUD operations)—all per convention in the art as adapted in accord with the teachings hereof. Of course, although, only two tables 18a, 18b are shown in the drawing, in practice, the server 12 and DBMS maintains many more of them.

In addition, server 12 maintains—i.e., affords access to and executes—user-defined applications ("apps") 22 that invoke functions provided by the database management system 20 to create user-defined and/or app-specific instantiations of tables 18, to store records or other structured data to those tables (which may, as discussed below, be shared with other apps and/or users), to retrieve records or other structured data from those tables, and to perform calculations (or other operations) on the retrieved data, all by way of non-limiting example, and all per convention in the art as adapted in accord with the teachings hereof.

Integration between the apps and the database management system 20 may be via an API associated with the latter, requests to which API are executed by the respective apps, all as per convention in the art as adapted in accord with the teachings hereof. The apps, which can be in source code format (e.g., scripts), intermediate format (e.g., p-code), object code format, executable format or otherwise, can be stored locally to or remotely from server, per convention in the art as adapted in accord with the teachings hereof. By way of non-limiting example, the apps 22 be can stored and accessed by the server 12 using DBMS 20 or otherwise, all as is within the ken of those skilled in the art in view of the teachings hereof. Moreover, although apps 22 are shown has stored separately from tables 18, in some embodiments they are stored physically and/or logically together. Moreover, in such apps, individual tables 18 are dedicated to specific apps 22 and may only be shared between them if necessary permissions are provided by the system administrator.

Access to the apps 22 and to the tables 18 dedicated to and/or otherwise associated with them, e.g., for purposes of their creation (a/k/a development), updating (a/k/a editing), deletion and/or execution, is controlled by the server 12 on a per-user, per-group or other basis of the type conventional in the art of security/privilege control. For purposes of simplicity, such access is referred to in the remainder of this document as per-user access, though, in fact, it may be on a per-group or other basis. In the drawing, the apps (and corresponding tables) accessible by each user (or group or other collection) are metaphorically represented in separate blocks 23. And, although maintenance of apps 22 by server 12 of the illustrated embodiment contemplates storage, access control and execution thereof, other embodiments may vary in this regard, e.g., by providing fewer or a greater number of such maintenance functions, as is within the ken of those skilled in the art in view of the teachings hereof. Moreover, although tables 18 may be associated with specific apps, the data in those tables may be shared among multiple apps and/or users, as defined by and administrator or other through the aforesaid security/privilege control. The tables and the structured data they contain are, accordingly, referred to as "shared" in the discussion below and elsewhere herein, regardless of whether any particular datum or table is, in fact, shared with another user or app.

Apps 22 of the illustrated embodiment are implemented in a visual programming language utilizing an integrated development environment (IDE) 26 configured for such—though, in other embodiments, the apps may be implemented in scripts or other textual languages. The IDE of the illustrated embodiment likewise provides an interface and functionality for use by users in creating, modifying and, more generally, managing user-defined tables 18, though such interface and functionality can likewise be provided by framework 24, without departing from the spirit hereof. To this end, for example, the IDE 26 (or framework 24) can utilize metadata contained in the schema for a user-selected table 18 to present a default view of that table, optionally, with its records winnowed (or otherwise selected) in accord a default query, and to display to the user options—based on the query, view, and report definitions provided in that schema—for (further) querying the table and presentation of views of or reports for it. The IDE 26 (or framework 24) can likewise, at user request, present a form defined in that metadata for entry of additional records or other structured data for storage into the table. Execution of such queries, views, reports and form-based input utilizing definitions in the schema is within the ken of those skilled in the art in view of the teachings hereof. Implementation of an IDE as discussed above and elsewhere herein is within the ken of those skilled in the art in view of the teachings hereof, though, it will be appreciated that embodiments may utilize tools other than an IDE for app and/or table implementation.

App 22 execution is effected via a framework 24 suitable for interpreting an internal representation of the visual programming language used for app definition and/or intermediate or compiled code generated by the IDE (or otherwise) therefrom—thus, for example, in some embodiments, the visual programming language is converted to C++ for execution on the server 12 and into REACT for compilation into code executable on client devices 14. Such conversions are within the ken of those skilled in the art in view of the teachings hereof. In addition to supporting app execution, the framework 24 can provide for additional state, context and access control particular to the apps 22. In addition, the framework 24 can support queries, views and reports and forms (e.g., for record or other structured data input) associated with the tables 18 that are dedicated to and/or otherwise associated with each app 22, as discussed above. Implementation of such a framework is within the ken of those skilled in the art in view of the teachings hereof.

A preferred framework 24 and IDE 26 for developing and executing apps 22, as well as for creating, accessing and maintaining tables 18, is commercially available from Quickbase, Inc., though like functionality commercially available in the marketplace or otherwise within the ken of those skilled in the art (all as adapted in accord with the teachings hereof) may be used instead or in addition.

To facilitate execution of apps 22 by the framework 24 and use of tables 18 in connection therewith, the IDE 26 (or other functionality executing on server 12—for example, framework 24) maintains a respective collection of metadata (referred to as a "schema") describing each such table 18 and app 22. By way of non-limiting example, upon invocation of an app 22 by a user, the framework 24 can use the app's schemas to insure that tables necessary for its execution are available for access by the app user. By way of further example, the schema for a table can be used by the framework 24 (or IDE 26) to pre-populate the table's fields onto a report, even before the table has been accessed from the DBMS 20.

In the drawing, each such schema is labelled "m" and appears adjacent the respective table 18 or app 22 it describes. In practice, the schemas m can be stored separately from those tables and apps, or otherwise, and can be stored locally or remotely, e.g., whether via DBMS 20, or otherwise, all as is within the ken of those skilled in the art in view of the teachings hereof. In the illustrated embodiment, the metadata in the schema m for each table and app contains the following, by way of non-limiting example:

Table
    table name and/or ID
    table description
    count of records in table
    names and types of data fields (i.e., "columns") in table
    definitions of queries, views, reports and forms for use in
       "navigating" the table (i.e., in finding and viewing
       records or other structured data in the table, as well as
       in adding new records or other structured data to the
       table)

App
    app name and/or ID
    app description
    names/IDs of tables used in app (i.e., tables dedicated to
       and/or associated with the app)
    names/IDs of variables used in app Unlike the prior art, the metadata contained in the schema for the respective apps and their tables is not hard-coded into the apps themselves. Instead, the schemas are stored separately from the apps. Thus, for example, in the illustrated embodiment, markup language (e.g., XML, HTML, etc.), scripting language or other coding suitable for interpretation and/or execution by the IDE 26, framework 24 (or app 22 itself) in order to generate a query, view, report or data input form for a given table is contained in the schema for that table—not in the app. This is in contrast to prior art, where apps typically include hard-coded instructions specifying that information.

As noted, the foregoing listing of schema contents is by way of example. The schemas for tables and/or apps of other embodiments may utilize fewer and/or additional metadata fields.

Network

Network 16 is a local area network (LAN), wide area network (WAN), metropolitan area network (MAN), public network (Internet), cellular network, or other network of the type known in the art, or a combination thereof, suitable for supporting communications between server 12 and client device 14 per convention in the art as adapted in accord with the teachings hereof. In the illustrated embodiment, those communications may be via HTTP protocol, though, other embodiments may vary in this regard.

Client Device

Client device 14 may be a desktop, laptop, tablet, smart phone or other computing device of the type known in the art suitable for establishing communications with server 12, e.g., over network 16, and for making requests to that server to retrieve data from, store data to, and otherwise manage shared tables 18, all per convention in the art as adapted in accord with the teachings hereof. To that end, the client device 14 executes a mobile framework 28 that requests and/or stores instantiations of apps 22 from server 12 and that executes the aforesaid internal representations (and/or aforesaid intermediate or compiled code) of those apps. Requests for such apps can be made by framework 28 at the behest of a user of the mobile device 14 upon invoking that framework 28, e.g., upon boot up of the client device or otherwise.

Execution of the apps 22 within the framework 28 of client device 14—e.g., for purposes of creating user-defined and/or app-specific instantiations of shared tables 18, storing records or other structured data to those tables, retrieving records or other structured data from those tables, performing calculations (or other operations) on the retrieved data, and navigating the shared data through queries, views and reports defined in the respective schema m for those tables—parallels execution of those same apps 22 within framework 24 on server 12 (keeping in mind, as noted above, that the internal and/or intermediate representations of those apps used for execution may vary). Like their counterparts on server 12, the programming instructions executed by the remote apps 22 to effect the foregoing operations assume that there will be continuous access to DBMS 20 for purpose of accessing those shared tables 18 and the data contained within them.

Functions provided by the DBMS 20 required by apps 22 executing on mobile framework 28 (or, more simply put, by those "remote apps 22")—e.g., the aforesaid CRUD functions for table creation, retrieval, updating and deletion—are invoked by way of requests made on behalf of the remote app 22 to the DBMS and, more specifically, by requests from the remote framework 28 to the server framework 24 and, then, to the DBMS 20. More simply put, and by way of non-limiting example, before calculations can be made by remote apps 22 on data in the tables 18, requests to the DBMS 20 for that data must first be routed from the mobile framework 28 to the DBMS 20, e.g., by way of the server framework 24, to obtain and make available copies of that data local to the client device 14 for those calculations.

In addition to app execution, mobile framework 28 of the illustrated embodiment provides an interface and functionality (like that described above in connection with IDE 26) for use by users in creating, modifying and, more generally, managing of user-defined tables 18. And, like server-based framework 24, mobile framework 28 can support user navigation of the table data through queries, views, reports and forms associated with the tables 18. For example, the mobile framework 28 can utilize metadata contained in the schema for a user-selected table 18 to present a default view of that table, optionally, with its records winnowed (or otherwise selected) in accord a default query, and to display to the user options—based on the query, view, and report definitions provided in that schema—for (further) querying the table and presentation of views of or reports for it. The mobile framework 28 can likewise, at user request, present a form defined in that metadata for entry of additional records or other structured data for storage into the table. Here again, however, to the extent that interface and functionality require functions provided by DBMS 20, requests to the DBMS 20 must first be routed from the mobile framework 28 to the DBMS 20 (e.g., by way of the server framework 24).

A preferred mobile framework 28 for requesting and executing apps 22, as well as for creating, accessing and maintaining tables 18, from client devices 14 is commercially available from Quickbase, Inc., though like functionality commercially available in the marketplace or otherwise within the ken of those skilled in the art (all as adapted in accord with the teachings hereof) may be used instead or in addition.

Offline Structured Data Entry, Navigation and Data Access on a Mobile Device

Described below and illustrated by lettered steps in FIG. 1 are methods of operating the mobile framework 28 to facilitate execution of remote apps 22—e.g., for purposes of opening user-defined and/or app-specific instantiations of shared tables 18 resident on remote server 12, storing records or other structured data to those tables, retrieving records or other structured data from those tables, performing calculations (or other operations) on the retrieved data, and navigating that data by way of queries, views and reports associated with the tables—notwithstanding that the client device 14 may be online only intermittently or occasionally or, put another way, when spotty connectivity between the client device 14 and server 12 may prevent requests from mobile framework 28 for CRUD (and other) functions provided by DBMS 20 from reaching server 12 or from being responded-to by it.

Unlike the prior art, this does not necessitate modifying the code of the remote apps 22, e.g., to accommodate potential service interruptions. Instead, the illustrated embodiment utilizes proxy software 30 executing on client device 14 (e.g., as part of mobile framework code 28 or otherwise) to (i) pass remote framework 28 requests on to the server 12 (and route back to the app by way of the framework 28 responses by the server 12 thereto) during intervals when there is connectivity between it and the client device 14 and to (ii) field and respond directly (i.e., without, first, going to the server 12) to requests made by the remote framework 28 on behalf of the app during off-line intervals, i.e., when there is not connectivity. To effect the latter function (i.e., fielding and responding directly to requests during off-line intervals), the proxy utilizes cache storage 31 that forms part of the proxy 30, the mobile framework 28 or is otherwise local to the client device 14) Other embodiments may, without departing from the teachings hereof, similarly use the proxy 30 to directly intercept requests made by the remote apps 22 (e.g., for CRUD (and other) functions provided by DBMS 20) and/or may utilize the mobile framework 28 itself (not segregated proxy functionality) for fielding and responding to such requests, whether from the mobile framework and/or the remote apps 22 themselves.

Implementation of code to effect the foregoing—as more particularly realized, by way of non-limiting example, in the steps discussed below and illustrated FIG. 1—is within the ken of those skilled in the art in view of the teachings hereof. It is pre-supposed in the example that the client device 14 has only intermittent or occasional (and, in any event, non-continuous) connectivity with server 12 via network 16 or otherwise: Steps A-L and S-T are effected when the client device 14 has such connectivity to server 12; Steps N-Q are effected when client device 14 lacks such connectivity.

Step A: (Optional) In some embodiments, upon initialization (e.g., upon bootup of client device 14, user request, or otherwise), mobile framework 28 makes a request for schemas m maintained by the server 12 for the current user 19 of client device 14 (e.g., as discussed above in connection with element 23). As shown in FIG. 1, that request is routed from the mobile framework 28 to proxy 30, which because it has connectivity to server 12 forwards the request to it. Like all requests and responses shown in FIG. 1 transmitted over network 16 between server 12 and client device 14, the aforesaid schema request routed by proxy 30 may be transmitted over network 16 via HTTP and/or other protocol(s) utilized by the server 12 and client device 14 for communications over network 16.

Step B: (Optional) In some embodiments, server 12 responds to the request in Step A by returning those schemas m maintained by the server 12 for user 19 of client device 14. The retrieval of those schemas m by the server 12 from framework 24 and/or DBMS 20 is within the ken of those skilled in the art in view of the teachings hereof. Proxy 30 of the illustrated embodiment receives and caches (e.g., to cache 31) the returned schemas m prior to forwarding them to the mobile framework 28, as illustrated in the drawing in connection with step B.

Step C: (Optional) In some embodiments, mobile framework 28 displays to user 19 (e.g., via a screen or other display on-board or coupled to the client device 14) available remote apps 22, as reflected by the schemas m returned in step B. This may be affected by way of the display of app icons, names or otherwise, all as is within the ken of those skilled in the art in view of the teachings hereof.

Step D: User 19 selects a remote app 22 for execution on client device 14 based on those shown in optional step C, if executed, or otherwise resident on device, and mobile framework 28 commences execution of that app. The selection and initiation of execution of such an app is within the ken of those skilled in the art in view of the teachings hereof.

In embodiments where optional Steps A-C are not utilized, the app selected for execution in this step issues requests for its own schema m, as well as those of its dedicated or otherwise associated tables 18, which requests (and the schemas returned by server 12 in response) are routed in the manner paralleling that of a data request (and response), e.g., as described below in connection with Steps E-F (although, schemas need not be cached in this instance by the proxy 30).

The executing remote app 22 utilizes the schemas "downloaded" from the server in Steps A-C or in Step D (i) to identify the names/IDs of tables 18 used by that remote app 22, (ii) to identify names and types of data fields (i.e., columns) in each such table, and the counts of records therein, (iii) for definitions of queries, views, reports and forms for the table. From that and other metadata supplied in the returned schemas, the remote app 22 issues requests to DBMS 20 for all data maintained in those tables. This parallels the pre-fetching discussed below in connection with Step K, though, the data requests are made by the executing remote app 22 (not by the proxy 20, as discussed in Step K) in the manner discussed above in connection with Steps E and F, including caching of the returned, pre-fetched data by proxy 30.

To facilitate its use, mobile app 22 (and/or the mobile framework 28 operating in conjunction) therewith presents to the user 19 for navigation table data associated with the app 22. More particularly, the app 22 and/or framework 28 displays to user 19 (e.g., via a screen on-board or coupled to the client device 14) views of records or other structured data contained in its dedicated/associated tables 18.

The format and content of the display is based on definitions of default or other views for the respective tables 18 obtained from their schema. Likewise, records or other structured data selected for display can be based on definitions of default or other queries for those respective tables in those schema. Along with the display of records or other structured data, the mobile framework displays to the user 19 options—based on the query, view, and report definitions provided in that schema—for (further) querying the table and presentation of views of or reports for it.

The selected app 22 and/or framework 28 likewise, at the user's request, presents forms whose format and contents are defined in the schema for the respective table 18 for entry of additional records or other structured data for storage into that table. The app 22 and/or framework 28 responds to user input of records or other structured data into those forms by the user 19 by generating a request to server 12 for a CRUD (or other) function(s) provided by DBMS 20 necessary to store to the respective table(s) 18 on the server and/or in DBMS 20 the newly entered data. This can be done in a manner paralleling that described below in steps J and/or Q for generating such requests to the server 12 in response to update requests by the mobile app 22 itself.

Presentation of table data based on definitions of views/reports contained in the respective schema, as well as presentation of forms likewise defined for input of table data, is within the ken of those skilled in the art in view the teachings hereof.

Although illustrated and discussed, here, only in connection with Step D, the presentation of table data by mobile framework 28 to faciliate user navigation can be effected throughout execution of the selected mobile app 22 on the client device 14. This can be based on table data initially requested from DBMS 20 and/or server 12 by the remote app 22 upon instantiation and updated throughout execution of the selected mobile app 22 or it can be based on data newly requested by that app 22 and/or the framework itself (e.g., in connection with pre-fetching as described in connection with Step K) and received from the server 12 and/or DBMS 20.

Step E: In the normal course of its execution on client device 14, the remote app 22 selected in step D executes an operation to request data from DBMS 20. This may be, by way of non-limiting example, in connection with retrieving records or other structured data from user-defined and/or app-specific instantiations of tables 18 and/or performing calculations (or other operations) on such data. The remote app request may be, for example, a retrieval request using the DBMS's API or otherwise. Mobile framework 28 responds to the remote app request by generating a request to server 12 for a CRUD (or other) function(s) provided by DBMS 20 necessary to fulfill the remote app request. So long as client device 14 has connectivity to server 12, proxy 30 routes the request made by the mobile framework 28 to server 12, even if it has previously prefeteched the requested data, e.g., in steps D and/or K.

Step F: Server 12 responds to the request in Step E by returning the requested data, the retrieval of which by server 12 and/or framework 24 from DBMS 20 is within the ken of those of skilled in the art in view of the teachings hereof. Proxy 30 of the illustrated embodiment receives and caches (e.g., to cache 31) the returned data prior to forwarding it to the mobile framework 28.

Step G: The executing remote app 22 and/or mobile framework 28 executes an operation to display the requested data to user 19, all in accord with convention in the art as adapted in accord with teachings hereof.

Step H: (Optional) User 19 inputs data, e.g., to update that displayed in step G or otherwise, for storage in table 18 whence that data came and/or in another table on server 12 and in DBMS 20 accessible thereon to user 19.

Step J: The executing remote app 22 executes operation(s) to perform calculations or other actions, if any, on the data displayed in Step G and/or input in step H, before executing an operation to cause that data to be stored to DBMS 20. This may be, for example, a storage or update request using the DBMS's API or otherwise. Mobile framework 28 responds to the remote app storage request by generating a request to server 12 for a CRUD (or other) function(s) provided by DBMS 20 necessary to fulfill the remote app request. So long as client device 14 has connectivity to server 12, proxy 30 caches (e.g., to cache 31) data contained in the request made by the mobile framework 28 and routes the request to server 12.

Step K: (Optional). In embodiments, where the remote app 22 does not, itself, prefetch table data as discussed above in connection with Step D, the proxy 30 performs the prefetch function. To this end, the proxy utilizes the schemas of the executing remote app 22 and of its dedicated/associated tables "downloaded" from the server in Steps A-C or in Step D (i) to identify the names/IDs of tables 18 used by that remote app 22, (ii) to identify names and types of data fields (i.e., columns) in each such table, and the counts of records therein, (iii) for definitions of queries, views, reports and forms for the table.

From that and other metadata supplied in the returned schemas, the proxy 30 issues requests to DBMS 20 for all data maintained in those tables. The request by proxy 30 may be, for example, a retrieval request using the DBMS's API or a CRUD (or other) function(s) provided by DBMS 20 necessary to obtain data not previously requested by the executing remote app 22 or otherwise cached by proxy 30. Though illustrated here as part of step K, data prefetching can be performed by proxy 30 at any time following return of the accessible schema in step B. Such data prefetching, whenever performed, is proscriptive: it is performed by proxy 30 in preparation for a potential outage of network 16 and/or other break in connectivity between client device 14 and server 12.

Step L: Server 12 responds to the request in Step K by returning the requested data. Proxy 30 of the illustrated embodiment receives and caches the returned data (e.g., to cache 31), as indicated in the drawing.

Step M: Connectivity between client device 14 and server 12 is disrupted by force majure or otherwise.

Step N: Just as in Step E, remote app 22 in the normal course of its execution on client device 14 executes an operation to request data from DBMS 20. This may be, by way of non-limiting example, in connection with retrieving records or other structured data from user-defined and/or app-specific instantiations of tables 18 and/or performing calculations (or other operations) on such data. The remote app request may be, for example, a retrieval request using the DBMS's API or otherwise. Mobile framework 28 responds to the remote app request by generating a request to server 12 for a CRUD (or other) function(s) provided by DBMS 20 necessary to fulfill the remote app request.

Notwithstanding the loss of connectivity in Step M, the executing remote app 22 (and/or the mobile framework 28 operating in conjuction therewith) can continue to present table data for navigation to the user 19 as described above in connection with Step D. In the illustrated embodiment, this is because the schema on which queries, views, reports and forms are based do not change during execution of the mobile app 22. Table data presented in views and reports during a period of lost connectivity can be based on that initially requested from DBMS 20 and/or server 12 by the remote app 22 upon instantation and updates to that data made by the selected mobile app 22, as discussed above, or it can be based on data newly requested by that app 22 and/or the framework itself (e.g., in connection with pre-fetching as described in connection with Step K) and received in response from the server 12 and/or DBMS 20.

Step P: Because connectivity to server 12 was lost in step M, proxy 30 returns from its cache 31 data fulfilling the request made by the mobile framework 28 to server 12 in step N. So long as client device 14 has connectivity to server 12, proxy 30 routes the request made by the mobile framework 28 to server 12.

Step Q: Just as in step J, the executing remote app 22 executes operation(s) to cause data to be stored to DBMS 20. This may be, for example, a storage or update request using the DBMS's API or otherwise. Mobile framework 28 responds to the remote app storage request by generating a request to server 12 for a CRUD (or other) function(s) provided by DBMS 20 necessary to fulfill the remote app request. Because connectivity to server 12 was lost in step M, proxy 30 caches (e.g., to cache 31) the data and request generated in step P.

Step R: Connectivity between client device 14 and server 12 is reestablished by reversal of the force majure or otherwise.

Step S: Upon detecting that connectivity has been reestablished, proxy 30 synchronizes with server 12 to ensure that any data stored by the proxy, e.g., in step Q, is in sync with corresponding data in the DBMS 20.

Step T: Such synchronization can include the transmission of cached data (e.g., to cache 31) from proxy 32 server 12, along with requests generated by mobile framework 28 requesting storage of that data to DBMS 20, or otherwise. It can also include transmission of metadata, such as user identification, client identification, schema identification, and otherwise, necessary to ensure proper storage of the transmitted data and processing of the accompanying request. Such synchronization, including the generation of alerts, warnings or other notifications in the event of a data conflict, is within the ken of those skilled in the art in view of the teachings hereof.

Navigation of data in the shared tables associated with the remote apps 22 parallels the operations described above in connection with Steps C-G; except, however, with respect to Step C, rather than displaying to user 19 available remote apps 22 as reflected in schemas m associated with those apps and their associated tables 18, the executing remote app 22 and/or mobile framework 28 displays queries, views and reports associated with the those tables; and, with respect to Step D, rather than accepting a user selection of a remote app 22 for execution, the executing remote app 22 and/or mobile framework 28 accepts a selection from user 19 of a query, view or report associated with a respective table to execute; and, with respect to Step E, the executing remote app 22 and/or mobile framework 28 requests data from DBMS 20 for the table (or tables) implicated by the requested query/view/report selection-if that data has not already been downloaded to the remote app 22 and/or framework 28; and, with respect to Step G, the executing remote app 22 and/or mobile framework 28, executes an operation to display the requested query/view/report, all as is within the ken of those skilled in the art in view of the teachings hereof.

Described above is a networked digital data processing system 10 for remote application execution—including for purposes of creating user-defined and/or app-specific instantiations of shared tables 18 resident on remote server 12, storing records or other structured data to those tables, retrieving records or other structured data from those tables, performing calculations (or other operations) on the retrieved data, and navigating data in the tables using queries, views and reports associated with them—notwithstanding that the client device 14 may be online only intermittently or occasionally with the server. It will be appreciated that the systems and methods described herein are but some embodiment of the invention and that other embodiments incorporating changes therein fall within the scope of the invention, of which we claim:

The invention claimed is:

1. A method of remote app execution comprising the steps of
   A. executing a remote app on a client digital data processor that is adapted to be intermittently connected for communications with a server digital data processor,
   B. with any of the remote app and a proxy executing on the client digital data device, requesting from the server digital data processor a schema for a table that is used by the app, and utilizing that schema to prefetch from the server digital data processor data for the table, and
   C. with the remote app, utilizing that schema
      (i) to facilitate user navigation of records in that table by presenting a view of records in the table, where the format and content of that view is defined in the schema, generating a report of records in the table, where the format and content of that report is defined in the schema, and selecting records for presentation in the view or report based on a query defined in that schema, and
      (ii) to respond to user input during execution of the application to generate requests to obtain table records from the server,
   D. with the client digital data device,
      (i) during intervals when there is connectivity between the client digital data processor and the server digital data processor, passing to the server digital data processor said requests, even if data requested by those requests has previously been fetched to and cached on the client digital data device,
      (ii) during intervals when connectivity between the client digital data processor and the server digital data processor is lacking, responding directly to the remote app in response to those requests, using previously fetched data without, first, passing those requests to the server digital data processor, and
      (iii) caching data prefetched from the server in step (B) and data fetched from the server in step (D)(i).

2. The method of claim 1, comprising a step of presenting to the user a form for data entry into the table, where a format and content of the form is defined by the schema.

3. The method of claim 1, comprising a step of displaying to the user upon execution of the remote app a default view of the table, where the format and content of the default view is defined in the schema.

4. The method of claim 3, comprising a step of winnowing table data displayed in the default view in accord with a default query defined in the schema.

5. The method of claim 1, comprising a step of presenting to the user options based on the definitions provided in that schema for any of querying the table and/or presenting views, reports or data input forms for the table.

6. The method of claim 1, wherein the schema is not hard-coded into the remote app.

7. The method of claim 1, wherein the schema comprises any of a markup language, a scripting language or other coding defining any of the format and content of the said view, the format and content of the said report, and the said query.

8. A digital data processing system, comprising
   A. a server digital data processor that maintains a table comprising records,
   B. a client digital data processor that is adapted to be intermittently connected for communications with the server,
   C. a remote app on a client digital data processor, the remote app executing instructions to cause that digital data processor to request from the server digital data processor a schema for a table that is used by that app, and to utilize that schema to
      (i) prefetch from the server digital data processor data for the table,
      (ii) present a view of records in the table, where the format and content of that view is defined in the schema,
      (iii) generate a report of records in the table, where the format and content of that report is defined in the schema, (iv) select records for presentation in the view or report based on a query defined in that schema, and (v) respond to user input during execution of the application to generate requests to obtain table records from the server, D. a proxy executing on the client digital data processor to (i) during intervals when there is connectivity between the client digital data processor and the server digital data processor, passing to the server digital data processor said requests, even if data requested by those requests has previously been fetched to and cached on the client digital data device, and (ii) during intervals when connectivity between the client digital data processor and the server digital data processor is lacking, responding directly to the remote app in response to those requests, using previously fetched data without, first, passing those requests to the server digital data processor (iii) caching data prefetched from the server in step (C) (i) and data fetched from the server in step (D) (i).

9. The system of claim 8, wherein the remote app includes instructions to cause the client digital data processor to present to the user a form for data entry into the table, where a format and content of the form is defined by the schema.

10. The system of claim 8, wherein the remote app includes instructions to cause the client digital data processor to display to the user upon execution of the remote app a default view of the table, where the format and content of the default view is defined in the schema.

11. The system of claim 10, wherein the remote app includes instructions to cause the client digital data processor to winnow table data displayed in the default view in accordance with a default query defined in the schema.

12. The system of claim 8, wherein the remote app includes instructions to cause the client digital data processor to present to the user options based on the definitions provided in that schema for any of querying the table and/or presenting views, reports or data input forms for the table.

* * * * *